No. 652,170. Patented June 19, 1900.
T. H. DIBBLE.
COOKER OR GRILL.
(Application filed Mar. 15, 1899.)

(No Model.) 3 Sheets—Sheet 1.

Witnesses
Marcus L. Byng
George W. Chill

Inventor
Theodore H. Dibble

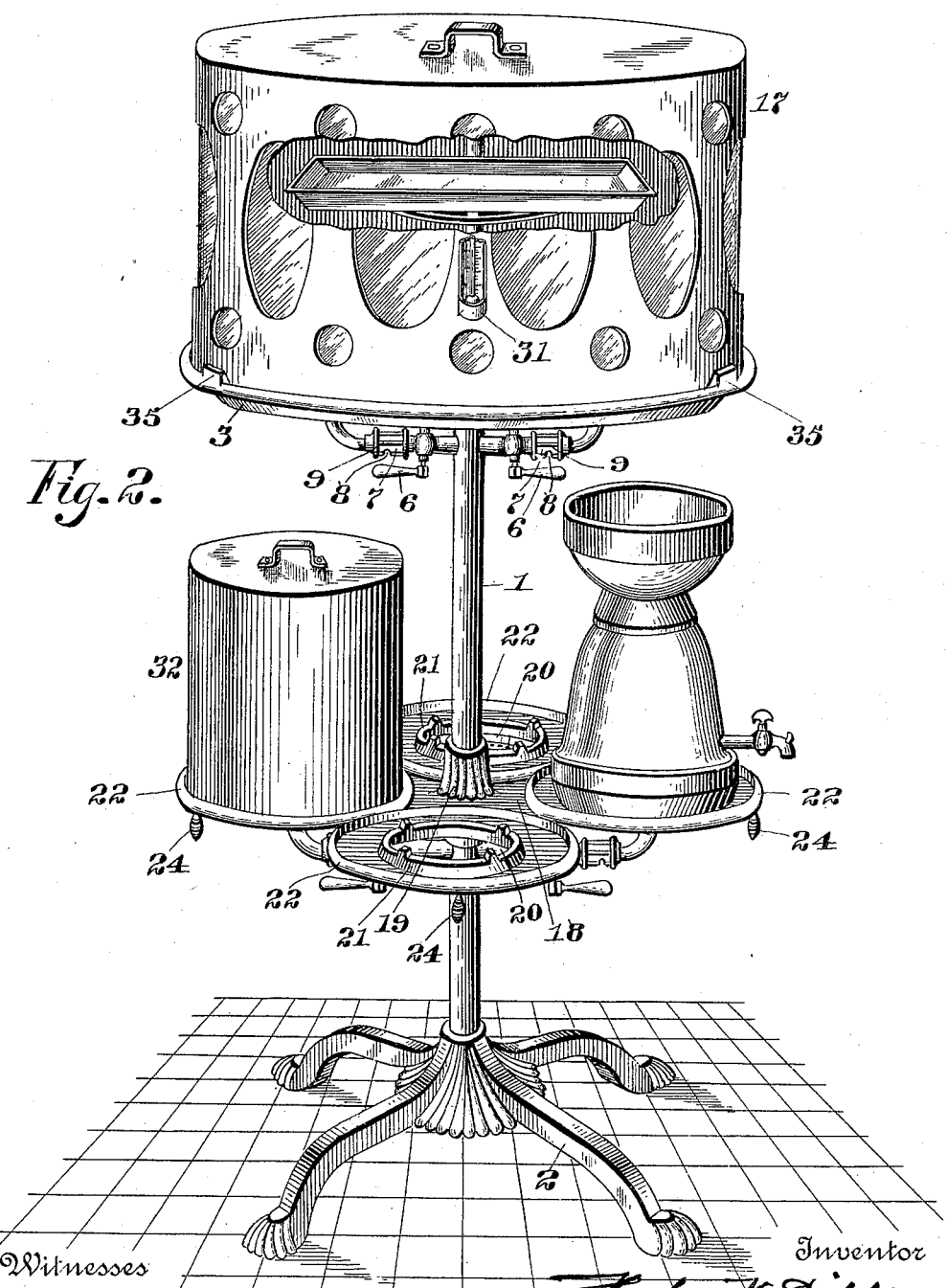

No. 652,170. Patented June 19, 1900.
T. H. DIBBLE.
COOKER OR GRILL.
(Application filed Mar. 15, 1899.)
(No Model.) 3 Sheets—Sheet 3.
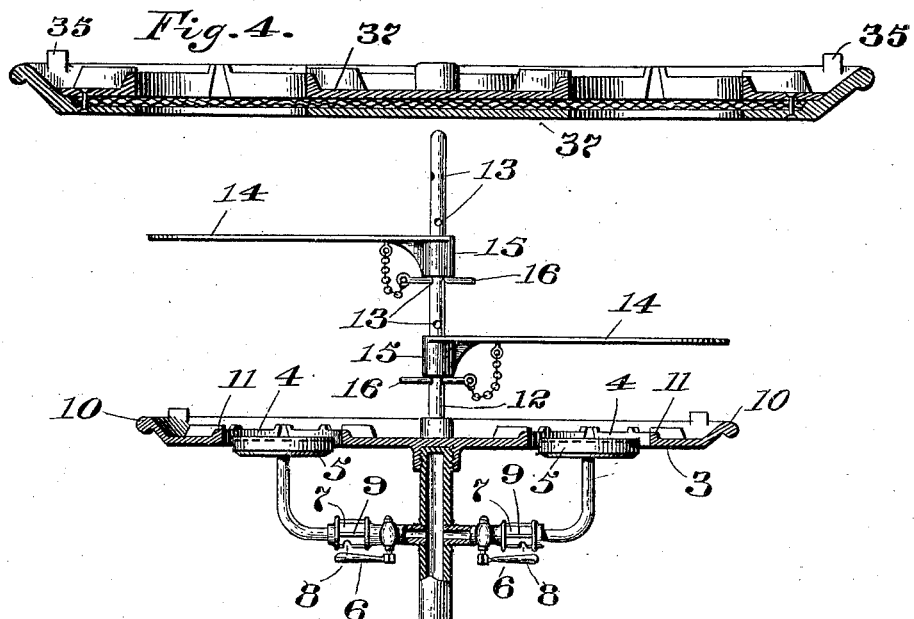
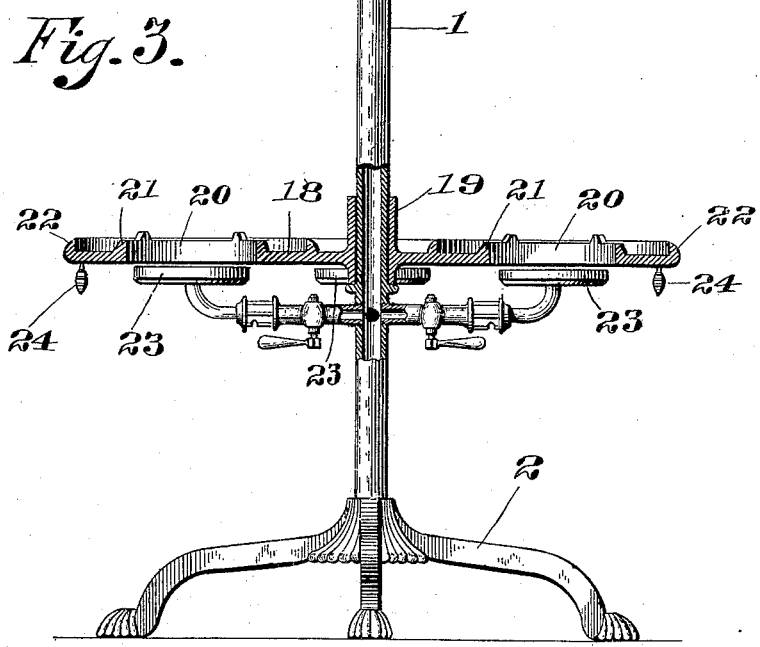
Witnesses
Marcus L. Byng.
George M. Obell.
Inventor
Theodore H. Dibble

UNITED STATES PATENT OFFICE.

THEODORE H. DIBBLE, OF SCRANTON, PENNSYLVANIA.

COOKER OR GRILL.

SPECIFICATION forming part of Letters Patent No. 652,170, dated June 19, 1900.

Application filed March 15, 1899. Serial No. 709,158. (No model.)

*To all whom it may concern:*

Be it known that I, THEODORE H. DIBBLE, a citizen of the United States, residing at Scranton, in the county of Lackawanna and State of Pennsylvania, have invented certain new and useful Improvements in Cookers or Grills; and I do hereby declare the following to be a full, clear, and exact description of the invention, such as will enable others skilled in the art to which it appertains to make and use the same.

My invention relates to improvements in cookers which I term and are known to the trade as the "student-grill."

It consists in a cooker or grill comprising a standard having an upper base or shelf and a lower movable base or shelf mounted upon the said standard, adjustable means for supporting things to be cooked upon said grill, and suitable burners for supplying the heat arranged beneath each of the shelves or bases.

It also consists in a cooking apparatus or grill comprising a standard having upper and lower bases, adjustable shelves mounted above the upper base, and a heating drum or hood provided with insulated lining for inclosing the articles to be cooked.

It also consists in certain other novel constructions, combinations, and arrangements of parts, as will be hereinafter fully described and claimed.

Figure 1:
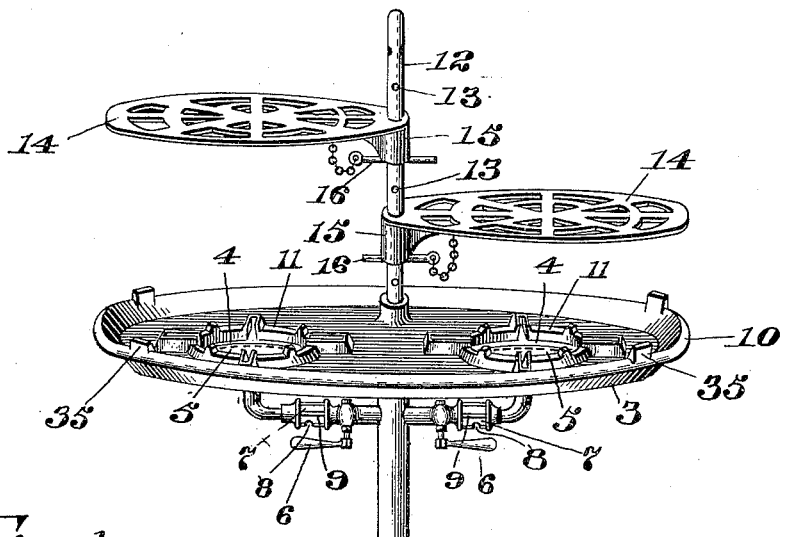
Figure 1:
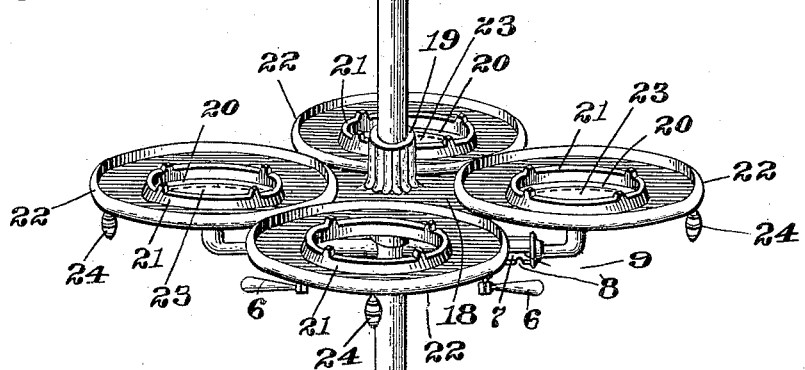
Figure 1:
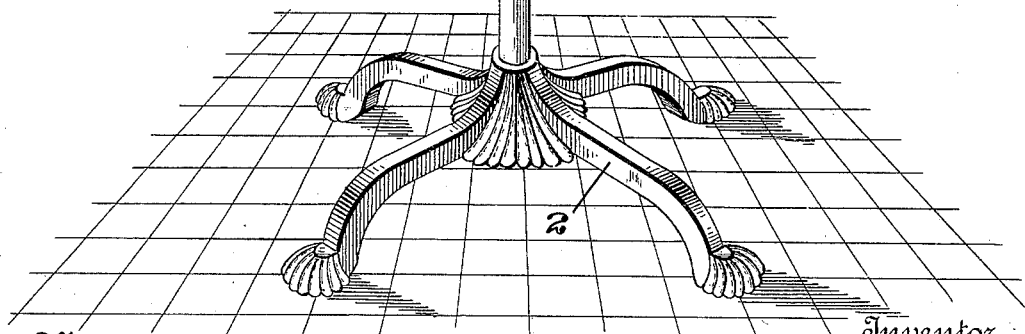

In the accompanying drawings, Figure 1 represents a perspective view of my improved cooking apparatus or grill, the heating drums or hoods being removed. Fig. 2 represents a similar view showing the drum in place, the sides of the drum being broken away to illustrate how articles may be supported therein, a steam-cooker or other device being mounted upon the lower supporting-base. Fig. 3 represents a vertical central section through the said grill. Fig. 4 represents a detail sectional view through the upper base, illustrating the manner of constructing the same with a double insulated bottom.

In producing a cooking apparatus or grill which can be readily used in any room or closet it is desirable to construct it so that it will not occupy a great deal of space and yet will be capable of doing a great deal of work.

In carrying out the features of my invention I preferably construct the grill with a main central support or standard, as 1, which is preferably hollow, so that it may be used as a gas-pipe when gas is used in the burners. The lower end of the stem 1 is firmly secured in a suitable standard or foot, as 2. To the top of the standard 1 is secured a broad supporting base or shelf, as 3, the said base being preferably screwed upon the end of the said standard 1.

While my improved grill is adapted to use various styles of heating means, yet for convenience I will first describe the same as it is generally produced, so that it is capable of being operated with gas. The upper shelf 3 is provided with two or more openings, as 4 4, beneath which are arranged gas-burners, as 5 5, of any desired construction. The burners 5 are preferably connected directly with the standard 1, from which they receive their supply of gas. Suitable cocks, as 6, are applied to each burner. The burners are preferably of the Bunsen type, and I preferably employ a rotating collar, as 7, for controlling the inlet of air. The sleeve 7 is provided with a slot, as 8, which coincides with a slot in the burner, and the sleeve may be so moved by rotation as to cut off a greater or less quantity of air from the burner, as is usual in these devices. In order to make it easy to turn the said sleeve 7, I prefer to construct the same with longitudinal ribs, as 9, which may be cast or otherwise formed upon the said sleeve. The thumb or finger engaging the said ribs will be able to readily turn the sleeve to the desired adjusted position. The upper shelf 3 is also provided with an upwardly-projecting outer flange, as 10, around its periphery and flanges 11 about each of the openings 4, so that any drippings from the food will be caught upon the shelf and cannot run off or drip upon the floor. Upon the upper side of the shelf 3 is mounted a vertical standard, as 12, said standard preferably engaging a socket formed in a boss upon the surface of the base and projecting upwardly to a suitable height. The standard is provided with a series of transverse openings or holes, as 13. Suitable shelves, as 14, are adjustably mounted upon the standard 12 and in order to revolubly engage the said standard are formed with sleeve extensions or sockets, as 15, which surround and fit snugly upon the standard 12. The shelves 14 are adjusted and supported at different heights upon the standard 12 by means of pins 16, which engage apertures or holes 13 in said standard. It will be seen that by removing the pins and placing them in different apertures the shelves may be arranged and supported at different heights upon the standard 12. In order to prevent the loss of the pins 16, they are preferably secured to the shelves by means of chains or other flexible connection. The upper burners 5 and 6 may be employed to cook materials in an open manner or may be used to bake or roast articles by employing a drum or hood, as 17, which is designed to be placed over the standard 12 and its adjustable shelves, resting upon the said base 3. The construction of my improved hood will be hereinafter more fully described. Below the upper shelf 3 and at any suitable point between the same and the floor, preferably about half-way, a lower base or shelf, as 18, is mounted. This base 18 is formed with a central bearing, as 19, which is adapted to fit snugly upon the stem 1, the said base being free to rotate upon the said standard. As illustrated in the drawings, the shelf 18 is preferably provided with four holes or heat-apertures, as 20, although a greater or less number could be employed without departing from the spirit of my invention. Each one of these holes is surrounded with upwardly-extending inner and outer flanges, as 21 and 22, respectively, which are similar to the flanges 10 and 11 upon the upper base and prevent any drippings from falling upon the floor. Below the base 18 I preferably secure two or more burners, as 23, which are preferably constructed in the same manner as the burners 5 and are supplied with cocks and air-controlling sleeves, as above described in connection with the said burners 5. These burners 23 are also connected directly with the hollow stem or standard 1 without intermediate fittings, from which they receive their supply of gas. The lower base 18 is preferably provided with handles, as 24, which are constructed so as not to conduct heat readily, they being what are called "cold handles," so that by taking hold of any one of them the base 18 can be easily revolved upon the standard 1 above the burners 23. As illustrated in the drawings, I preferably construct the grill with three burners 23, one upon each side and one in the back, the openings in the base 18 in the front being provided with no burner. Of course this opening can be easily brought over any one of the burners 23 by rotating the said base 18.

In order to supply gas to the grill, a suitable pipe, either flexible or otherwise, may be secured to the standard 1, so as to deliver gas therein, the other end of the said connection being attached to any convenient gas-fixture.

In the use of the grill it will be seen that the adjustable shelves 14, in connection with the upper base 3, may be used to great advantage, for they can be turned so as to support articles above either burner or between the burners and may be arranged one above the other, or they may be turned back out of the way when it is desired to set some article over both burners at once. In connection with this upper base and the adjustable shelves an important feature of my invention is the hood 17. This hood is made of sufficient size to be placed over and entirely inclose the standard 12, the shape of the said drum being such that it will fit nicely upon the base 3. I find that a very convenient as well as artistic shape for the base 3 and the drum is that of an oval. The drum 17 should be thoroughly insulated to hold the heat in and apply it to the materials to be cooked.

Steam-cookers, hot-water urns, and other devices may be employed upon the different burners of the grill at the same time. In order to hold the upper drum 17 in place upon the shelf 3, guide-pins, as 35, may be secured upon the edges of the said base 3, as illustrated in the drawings. I find that it is sometimes desirable to construct the bases or shelves in such a manner that they may be insulated against the radiation of heat, and in forming a base or shelf of this kind I preferably form upper and lower bases or metallic coverings, as 37 37, between which insulating material may be placed, as described above in connection with the drum 17. The upper and lower casings are preferably riveted together at their edges, suitable insulating material being interposed between them, thus forming a base of the desired construction.

While I have described my invention as adapted particularly to the use of gas as a heating agent, yet it will be readily seen how easily the device can be adapted to the use of other heating agents. For instance, when it is desired to use oil, as in lamps, lamps may be placed upon the lower shelf 18, so as to be directly beneath the upper burner-openings in the base 3, and for the burner-openings upon the lower shelf 18 lamps may be placed beneath the same upon the floor. If it is desired to use electricity, I preferably locate high-resistance coils in the burner-openings and connect them with any suitable source of electricity, the wires being preferably passed through the hollow standard 1.

A grill of this character is very compact in form and can easily be used in the corner of a room, behind a screen, or in a small closet, it not being sufficiently large to take up much room. It is, however, capable of being used to cook for a great many people, there being no difficulty in cooking sufficient food for from two to twenty people without using the enlarged bases. By means of these enlarged bases the capacity of the cooker or grill can be increased to almost any desired extent.

It will be seen that the burners and other parts are screwed directly to the standard without any intermediate fittings, thus simplifying the construction.

Having now described my invention, what I claim as new, and desire to secure by Letters Patent, is—

1. A cooker or grill for household purposes, comprising a single vertical standard or rod, a plurality of burners carried by said standard and arranged horizontally around the same, a comparatively-large supporting-base constructed to receive and hold a hood and provided with a plurality of burner-openings so that a plurality of burners can be operated simultaneously beneath the burner-openings, and a removable hood which rests upon the base and covers all the burner-openings and incloses the same, substantially as described.

2. A cooker or grill comprising in its construction a vertically-arranged standard, a plurality of stationary burners carried by said standard and arranged horizontally around the same, a comparatively-large supporting-base constructed to receive and hold a hood and provided with a plurality of burner-openings, so that a plurality of burners can be operated simultaneously beneath the burner-openings, shelves arranged horizontally above the supporting-base and adjustable vertically and horizontally, whereby articles placed on the shelves can be raised or lowered and brought over any particular burner-opening, and a hood which rests on the base and extends over all of the burner-openings and incloses the shelves, substantially as described.

3. A cooker or grill for household purposes comprising a vertically-arranged standard, a plurality of burners carried by said standard and arranged horizontally around the same, a comparatively-large supporting-base constructed to receive and hold a hood, and provided with a plurality of burner-openings, so that a plurality of burners can be operating simultaneously beneath the burner-openings, a vertically-arranged rod attached to said horizontally-arranged base and provided with adjusting-holes, removable pins passed through some of said holes, and horizontally-swinging shelves carried by said rod and supported on the pins at the desired heights, the construction and arrangement being such that the shelves can be adjusted to any desired height and turned horizontally over any burner-opening, and a hood which rests on the base and extends over all of the burner-openings and incloses the shelves, substantially as described.

4. A cooker or grill, comprising in its construction a vertically-arranged standard, a plurality of burners carried by said standard and arranged horizontally around the same, a comparatively-large supporting-base constructed to receive and hold a hood and provided with a plurality of burner-openings so that a plurality of burners can be operated simultaneously beneath the burner-openings, shelves arranged above the supporting-base and capable of adjustment horizontally whereby articles placed on the shelves can be brought over any particular burner-opening, and a hood which rests on the base and extends over all the burner-openings and incloses the shelves, substantially as described.

5. A cooker or grill for household purposes, comprising in its construction a vertically-arranged hollow standard or rod, an upper plurality of burners carried by said standard and arranged horizontally around the same, pipes connecting the burners with the standard for supplying fuel therefrom to the said burners, a lower plurality of burners connected to the standard and arranged horizontally around the same and connected by pipes to the said standard for supplying fuel thereto, an upper and a lower horizontally-arranged supporting-base carried by said standard, each base being provided with a plurality of burner-openings, the upper base being constructed to receive and hold a hood, and the lower base being capable of being revolved over the lower burners so that any particular burner-opening in said lower base can be brought over any particular burner, and two or more of the burners in either base can be operating simultaneously, and a hood provided on the upper base which extends over all of the burner-openings thereon, the construction and arrangement being such that articles of food can be baked on the upper base and boiled and otherwise cooked on the lower base, substantially as described.

In testimony whereof I hereunto affix my signature in presence of two witnesses.

THEODORE H. DIBBLE.

Witnesses:
H. E. PAINE,
E. I. PAINE.